(12) United States Patent
Morello et al.

(10) Patent No.: US 9,505,264 B2
(45) Date of Patent: Nov. 29, 2016

(54) COVER FOR A WHEEL-HUB BEARING

(71) Applicants: Fausto Morello, Sommariva del Bosco (IT); Marcello Rossi, Turin (IT)

(72) Inventors: Fausto Morello, Sommariva del Bosco (IT); Marcello Rossi, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 38 days.

(21) Appl. No.: 14/505,116

(22) Filed: Oct. 2, 2014

(65) Prior Publication Data
US 2015/0091368 A1  Apr. 2, 2015

(30) Foreign Application Priority Data

Oct. 2, 2013  (IT) .............................. TO2013A0794

(51) Int. Cl.
| | |
|---|---|
| F16C 33/76 | (2006.01) |
| B60B 7/00 | (2006.01) |
| B60B 27/00 | (2006.01) |
| F16C 33/72 | (2006.01) |
| F16C 33/78 | (2006.01) |
| F16C 41/00 | (2006.01) |
| F16C 19/18 | (2006.01) |

(52) U.S. Cl.
CPC ......... *B60B 7/0013* (2013.01); *B60B 27/0005* (2013.01); *B60B 27/0073* (2013.01); *F16C 33/723* (2013.01); *F16C 33/783* (2013.01); *F16C 19/186* (2013.01); *F16C 33/768* (2013.01); *F16C 41/007* (2013.01); *F16C 2326/02* (2013.01)

(58) Field of Classification Search
CPC .............. F16C 19/184–19/187; F16C 19/386; F16C 33/723; F16C 33/726; F16C 33/768; F16C 33/783; F16C 33/784; F16C 33/7843; F16C 33/7869; F16C 33/7886; F16C 35/04; F16C 41/007; F16C 2326/02; B60B 27/0005; B60B 27/0073; B60B 27/001; B60B 7/0013
See application file for complete search history.

(56) References Cited

U.S. PATENT DOCUMENTS

| | | | | |
|---|---|---|---|---|
| 3,467,395 A | * | 9/1969 | Kan ................... | F16C 33/7813 277/551 |
| 5,148,104 A | * | 9/1992 | Ishikawa ............... | G01P 3/443 188/181 R |
| 5,195,807 A | * | 3/1993 | Lederman ............... | B60B 7/002 301/108.1 |
| 5,380,103 A | * | 1/1995 | Lederman ............... | B60B 7/002 301/108.3 |
| 6,997,615 B2 | * | 2/2006 | Takada ............... | B60B 27/0005 384/448 |
| 8,888,372 B2 | * | 11/2014 | Ciulla ................. | B60B 27/0068 384/448 |
| 2015/0010255 A1 | * | 1/2015 | Ishida ................... | F16C 33/726 384/476 |

FOREIGN PATENT DOCUMENTS

WO    2013/118584    * 8/2013

* cited by examiner

*Primary Examiner* — James Pilkington
(74) *Attorney, Agent, or Firm* — Bryan Packjian; SKF USA Inc. Patent Dept.

(57) ABSTRACT

A cover for a wheel-hub bearing made of plastic is provided. The cover includes an end wall that is arranged transversely with respect to a central axis (X) and a cylindrical mounting wall, which extends axially from one side of the end wall around the axis (X). The cover also includes a snap-action step that projects in a radially outwards direction from the cylindrical wall for locking the cover on a tubular appendage of the bearing a resilient ring that is arranged between an annular shoulder portion of the cover and the tubular appendage to exert a resilient recall action on the snap-action step.

9 Claims, 1 Drawing Sheet

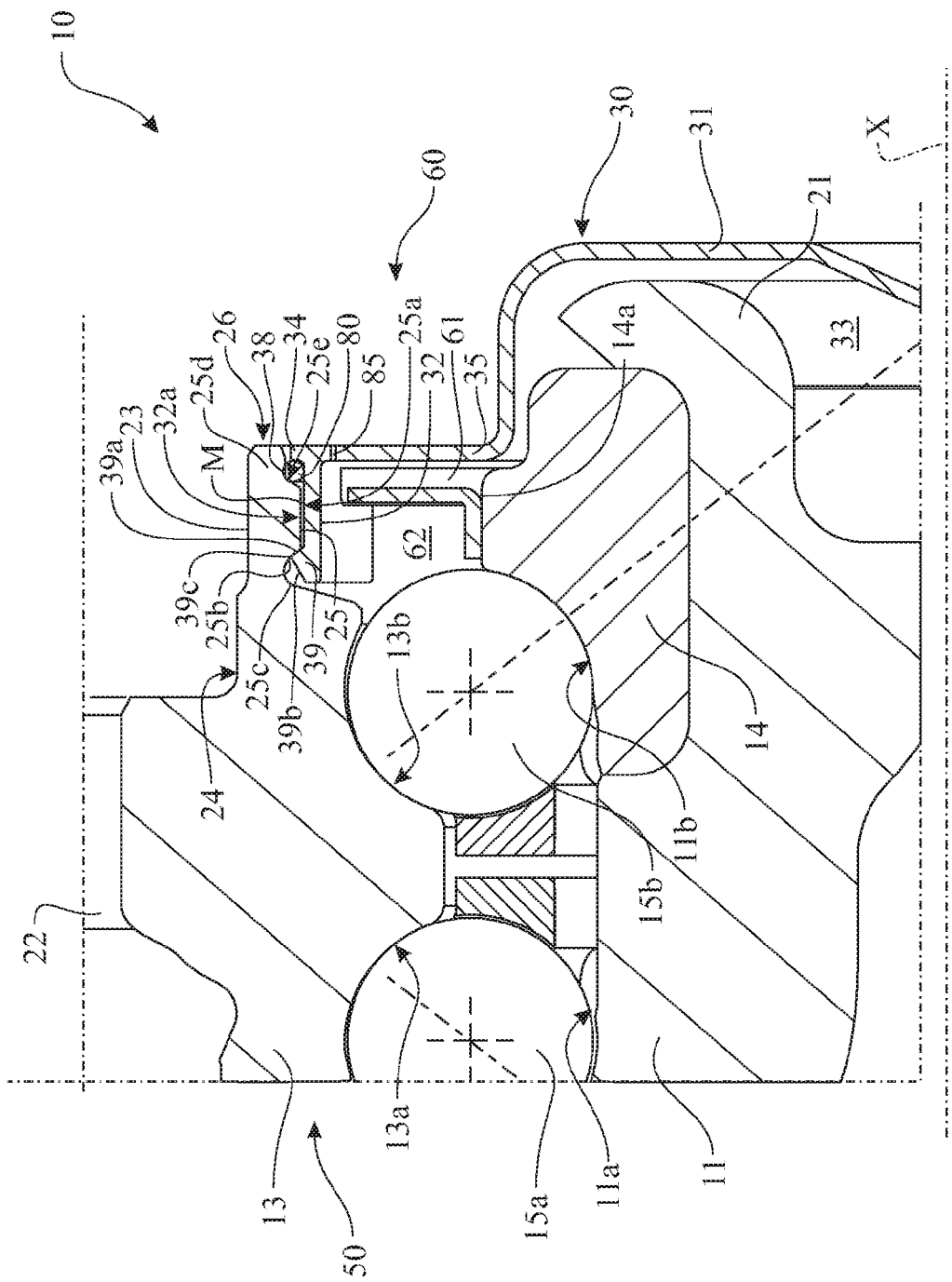

COVER FOR A WHEEL-HUB BEARING

CROSS REFERENCE TO RELATED APPLICATIONS

This is a Paris Convention Application claiming the benefit of Italy Patent Application Serial Number TO2013A000794 filed on 2 Oct. 2013, which is incorporated herein by reference in its entirety.

TECHNICAL FIELD

The present invention is related to a cover for a wheel-hub bearing. Moreover, the invention also refers to a hub-bearing unit for a motor vehicle wheel.

BACKGROUND ART

Known covers are made of plastic material and comprise an end wall and a cylindrical sidewall for their mounting in a wheel-hub bearing, to protect from external contaminants both the bearing and a detection device of the wheel angular speed, which is coupled to the bearing.

The mounting of the cover in the bearing is realized by a press-fit operation between the sidewall and an outer ring of the bearing. Usually, the mounting sidewall is provided with a metal reinforced insert, to make stiffer the sidewall as, for example, disclosed in US 2006/159377 A1. Such a metal reinforced insert means a remarkable higher production cost of the above described covers and can also cause bi-metal problems, if in contact with the outer ring of the bearing. Therefore, recently, cheaper solutions have been realized, according to which the cover, not having anymore the known metal reinforced insert, is snap-mounted on a tubular appendage of the outer ring, thanks to snap-action locking means. Such snap-action locking means are steadily fixed to the cylindrical sidewall of the cover and are snap-engaged in a recess or in an undercut, which is formed in a cylindrical cavity of the tubular appendage.

Document EP 0 778 423 A2 discloses a cover for bearings, which is snap-mounted in a bearing case and comprises an end wall, arranged transversally with respect to the central axis of the bearing, a tapered sidewall and a seat for a seal resilient ring.

The above described covers are interposed between a detection sensor, outwardly mounted with respect to the bearing, and an encoder, inwardly mounted with respect to the bearing. Since the reading capability of the detection sensor also depends on the correct positioning of the cover, the design of both the tubular appendage of the outer ring and the snap-action locking means must be carefully realized, with very tight production tolerances, to allow a very accurate mounting of the cover.

By the way, very tight production tolerances and high accuracy of the assembling process are not suitable for current and stringent needs, requiring a reduction of both production time and costs.

SUMMARY OF THE PRESENT INVENTION

Aim of the present invention is to realize a cover for a wheel-hub bearing, the cover having production and mounting costs lower than the ones of the known covers and, at the same time, better protective features.

According to the present invention, a cover for a wheel-hub bearing is realized, the cover having the characteristics as in the enclosed independent claim.

Further embodiments of the invention, preferred and/or particularly advantageous, are described according to the characteristics as in the enclosed dependent claims.

BRIEF DESCRIPTION OF THE DRAWING

A preferred embodiment of the invention will be now described, in an exemplifying and not limitative way, by reference to FIG. 1, in which an axial section is shown, with some parts taken away for clarity, of a wheel hub-bearing unit, incorporating a cover, which brings a sensor.

DETAILED DESCRIPTION OF THE PRESENT INVENTION

In the enclosed drawing, with 10 is referenced as a whole a wheel hub-bearing unit, so called "of third generation", which shows a central axis and is suitable to be interposed between a driven wheel (not shown) of a motor vehicle and a suspension knuckle (not shown) of the same vehicle, to allow a wheel rotation with respect to the knuckle and around the axis X.

The unit 10 comprises a rolling bearing 50 and detection device 60 of the wheel angular speed, which is coupled to the same bearing 50.

In all the present description and enclosed claims, terms and wording, indicating positions and directions, as "radial" or "axial" have to be understood as referred to the rotation axis X. Wording as "axially inner" or "axially outer" have to be referred to a mounting condition of the hub-bearing unit on the motor vehicle.

On its turn, the bearing 50 comprises:
- a central hub 11, rotatable around the axis X and outwardly provided with a rolling race 11a;
- an outer ring 13, stationary, radially arranged on the outside of the hub 11, and inwardly provided with two rolling races 13a and 13b, exposed towards the central hub 11;
- an inner ring 14, having a correspondent rolling race 11b, axially side by side to the race 11a, the inner ring being steadily fixed on the central hub 11, according to a known technology, by cold forming of an end edge 21 of the same central hub 11; and
- a double row of rolling members, in this example balls, 15a, 15b, arranged inside the rolling races 11a, 11b, 13a, 13b, to allow the rotation of the central hub 11 with respect to the outer ring 13.

The central hub 11 is a flanged hub, for the fixed mounting of the mentioned wheel (not shown), and the outer ring 13 is provided with a radially outer flange 22, suitable to be assembled at the mentioned knuckle (not shown), and a tubular appendage 23, which projects from the axially inner side of the bearing 50, in other words, the side which, in a mounting condition, points the vehicle inside. The tubular appendage 23 is confined by a radially outer surface 24, cylindrically shaped, suitable to be inserted in a housing hole (not shown), realized in the mentioned knuckle, by a radially inner surface 25, co-axial to the radially outer surface 24, and by an end flat surface 26, which is transversal to the axis X, and radially protrudes at the axially inner end of the same tubular appendage 23.

The inner surface 25 comprises a cylindrical and axially intermediate portion 25a and an axially outer portion 25b, in undercut, having an internal diameter "D1" greater than an internal diameter "D2" of the cylindrical and axially intermediate portion 25a. The inner surface 25 also comprises a cylindrical and axially internal portion 25d, also in undercut, having an internal diameter "D3" greater than the internal diameter "D2" of the cylindrical and axially intermediate portion 25a. The cylindrical portions 25a and 25b are connected by a connecting portion 25c, which is preferably tapered in an axially inner direction, for example conical, while the cylindrical portions 25a, 25d are connected by a connecting portion 25e, which is preferably tapered in an axially outer direction, for example conical.

The detection device 60 comprises:
an encoder 61, located in an annular cavity 62, which is defined by the tubular appendage 23 and by the inner ring 14, and is mounted on a cylindrical outer surface 14a of the same inner ring 14, the encoder rotating around the axis X, together with the central hub 11; and
cover 30, which brings the sensor and is mounted in an axially internal position on the tubular appendage 23 of the outer ring 13.

The cover 30, preferably made of plastic material, comprises a shaped end wall 31, transversal to the axis X, and a cylindrical sidewall 32, which axially projects around the axis X, on one side of the end wall 31, and forms with the end wall 31 a recess 33, inside which is also located the end edge 21 of the central hub 11.

The cover 30 forms an annular peripheral protrusion 34 (which can be referred to as a first protrusion), projecting in a radially outer direction from the cylindrical wall 32 and has a shoulder surface 38, radially projected and pointing in an axially outer direction, the surface acting as axial shoulder of the cover 30, to ensure a proper mounting on the tubular appendage 23.

The end wall 31 has an annular portion 35, axially indented towards the bearing 50 and co-planar to the annular peripheral protrusion 34, in a position directly pointing to the encoder 61, in other words axially interposed between the encoder 61 and a sensor (not shown), out of the bearing 50. The sensor and other components of the detection device 60 of the angular speed are known and therefore do not require to be disclosed in detail. It is sufficient to remark that the encoder 61 is axially located on the opposite side of the sensor with respect to the annular portion 35, axially indented from the end wall 31, has an annular shape and is made of rubber, which incorporates magnetized powder particles, for example ferrite. The encoder 61, which can be fixed in different ways and positions to the inner ring 14 or other element, which is angularly coupled to the central hub 11, generally has north and south magnetic poles, which are alternated around its circumference. In the present embodiment, the sensor is exposed towards the encoder 61 in an axial direction. In other embodiments, the sensor can be mounted in a way to be exposed to the encoder in a radial direction. The invention is not-limited neither to the specific detection sensor nor to the related encoder.

The cylindrical wall 32 of the cover 30 is completely made of plastic material and, therefore, does not have any known metal reinforced insert. The assembling of the cover 30 on the tubular appendage 23 is carried out by means of a snap-locking. To this purpose, on the axially opposite side with respect to the peripheral protrusion 34, the cylindrical wall 32 presents a step 39, in a position axially spaced from the shoulder surface 38 and suitable to snap-cooperate with the undercut, which is formed by the portions 25a and 25b in the internal surface 25 of the tubular appendage 23. In the preferred embodiment, the step 39 is circumferential continuous, in a shape of an annular ridge, or alternatively, the step can be circumferential discrete, for example comprising a plurality of indentations, angularly spaced each other. The step 39 has a surface 39a, which is tapered in an axially internal direction, for example conical, and projects in a radially external direction with respect to a cylindrical surface 32a of the cylindrical wall 32, and a surface 39b which is tapered in an axially external direction, for example conical, starting from the surface 39a. The surface 39a is axially located close to the connecting portion 25c, and the two surfaces 39a and 39b form an annular cusp 39c, whose external diameter "D4" is greater than the diameter "D2" of the radially internal surface 25. Collectively, surfaces 39a, 39b of step 39 define a second protrusion. The cylindrical surface 32a extends axially between the peripheral or first protrusion 34 and the step or second protrusion 39.

Traditionally, the axial distance L between the step 39 and the peripheral protrusion 34, as a function of the machining tolerances, could have been equal or even smaller than the distance between the two connecting portions 25c and 25e, so that to maximize the effectiveness of the snap-mounting of the cover 30. Instead, in the disclosed embodiment, the axial distance L between the step 39 and the peripheral protrusion 34, is greater than the distance between the two connecting portions 25c and 25e, and the cover 30 comprises a resilient ring 80, which is assembled on the cylindrical sidewall 32, and can be inserted inside the cylindrical and axially internal portion 25d. Therefore, the resilient ring 80 can be located close to the shoulder surface 38, in a way to be compressed, after the mounting, between the peripheral protrusion 34 and the connecting portion 25e.

The step 39 slides along the surface 25, until reaching the undercut cylindrical portion 25b, then is inserted inside the same undercut cylindrical portion 25b and is located with its surface 39a axially close to the connecting portion 25c. The sliding of the step 39, along the surface 25 is substantially free (just the friction between the cusp 39c against the same surface 25 must be overcome) until when the resilient ring 80, which is close to the shoulder surface 38, will also be close to the connecting portion 25e. To complete the snap-insertion of the step 39, once the resilient ring 80 meets the connecting portion 25e, a further axial pressure on the cover 30 must be exerted, thus obtaining at the same time an axial compression of the resilient ring 80.

When the step 39 is snap-inserted in the undercut cylindrical portion 25b, the resilient ring 80 remains resiliently compressed and exerts a resilient recall action on the surface 39a of the step 39, which is close to the connecting portion 25c. Both due to the reciprocal engagement of the surface 39a and the connecting portion 25c, and the resilient tensile stress, which is provided by the resilient ring, the surface 39a is kept against the connecting portion 25c, thus ensuring the correct axial positioning of the cover 30 with respect to the bearing 50. The choice to realize the connecting surfaces 25c and 25e as tapered surfaces, in opposite axial directions, further reduces almost to zero possible axial clearances between the cover 30 and the outer ring 13.

Thanks to the described embodiment, whatever axial clearance between the cover 30 and the outer ring 13 is reduced to zero and the cover 30 not only is steadily fixed on the same outer ring 13, but also remains in a predetermined position, which is suitable for the sensor reading. The use of the resilient ring 80 not only allows one to realize the dimensioning of the several components with not so tight tolerances, thus allowing cheaper design and production, but also allows a very accurate assembling of the cover 30.

Moreover, traditionally the diameters of the surface 32a of the cylindrical wall 32 and the radially internal surface 25 had to be substantially similar, in a way to create a radial interference between the surface 32a and the surface 25, along the portion L, thus avoiding the incoming of contaminants inside the bearing 50. Instead, in the disclosed embodiment, the diameters of the surface 32a of the cylindrical wall 32 and the cylindrical and axially intermediate portion 25a of the internal surface 25 do not need to be similar: in fact, between the surfaces 25a and 32a a cylindrical interspace M is realized. Such an interspace M is, indeed, completely sealed toward outside of the bearing 50, thanks to the resilient ring 80, which avoids the incoming of whatever contaminant inside the bearing 50.

Preferably, but this is not a mandatory condition, in the disclosed embodiment of the cover 30, the annular portion 35, which is axially indented from the end wall 31, presents a hole 85, which passes through the same annular portion 35 and allows to compensate possible pressure differences between the inside and the outside of the bearing 50, thus ensuring a stable mounting of the cover 30.

The hole 85 has a diameter which is smaller than the diameter of a water drop or other contaminants, which can enter the inside of the bearing 50, thus deteriorating the lifetime and the reliability.

Other than the embodiments of the invention, as above disclosed, it is to be understood that a vast number of variations exist. For example, the portions of the surfaces 25a, 25b, here shown as cylindrical, as an alternative can be conical. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A cover for a wheel-hub bearing, the cover being made of plastic and comprising:
an end wall arranged transversely with respect to a central axis (X),
a cylindrical mounting wall which extends axially from one side of the end wall around the central axis (X), an outer surface of the cylindrical mounting wall having a first protrusion, a second protrusion, and an axially extending surface between the first and second protrusions, wherein the first and second protrusions extend radially outwardly with respect to the axially extending surface;
the cover being configured to lock to a tubular appendage of the bearing, wherein an inner surface of the tubular appendage comprises an intermediate surface that is axially between an axial outer portion and an axially inner portion, the axial outer portion and the axial inner portion each having internal diameters that are greater than an intermediate surface diameter, the axial outer portion being connected to the intermediate surface by a first connecting surface, the axial inner portion being connected to the intermediate surface by a second connecting surface, a first diameter of the axially extending surface of the cylindrical mounting wall is less than or equal to the intermediate surface diameter such that no axially extending surface of the cylindrical mounting wall is configured to be in an interference fit or a press fit with the tubular appendage, the first projection of the cylindrical mounting wall having an outer diameter that is greater than the intermediate surface diameter and is configured to engage with the first connecting surface to lock the cover to the tubular appendage;
the cover including a ring arranged between the second protrusion of the cover and the tubular appendage, wherein
the ring is configured to exert a resilient recall action on the first projection.

2. The cover according to claim 1, wherein the second protrusion has a shoulder surface extending radially and facing the side where the cylindrical mounting wall extends; and wherein
the first projection being defined by a tapered surface that is arranged to contact the first connecting surface of the tubular appendage and resiliently recalled into contact with the first connecting surface by the ring, wherein the first connecting surface is tapered.

3. The cover according to claim 2, wherein the ring is configured to be resiliently compressed between the second projection and the second connecting surface of the tubular appendage; the first and second connecting surfaces being tapered in axially opposite directions, and wherein a first axial distance between the first projection and the second projection is greater than a second axial distance between the first connecting portion and the second connecting portion.

4. The cover according to claim 3, wherein the ring is resilient such that when compressed the ring exerts the resilient recall action.

5. The cover according to claim 1, wherein the cylindrical mounting wall is made entirely of plastic and does not have metal reinforcing inserts.

6. The cover according to claim 1, wherein the first diameter of the axially extending surface of the cylindrical mounting wall is less than a minimum diameter of the inner surface of the tubular appendage, the axially extending surface is configured to be axially aligned with the intermediate surface such that the axially extending surface, together with the intermediate surface of the tubular appendage, defines a cylindrical interspace (M) that is sealed with respect to the exterior of the bearing by the ring.

7. A hub-bearing unit for a vehicle wheel, the hub-bearing unit comprising:
a central hub rotating about a central axis (X);
a rolling bearing that includes a stationary ring arranged radially on the outside of the central hub and rolling members arranged between the stationary ring and the central hub, the stationary ring forming a tubular appendage that projects from an axially inner side of the stationary ring and has a radially inner surface extending in an axial direction, wherein the radially inner surface of the tubular appendage comprises an intermediate surface that is axially between an axial outer portion and an axially inner portion, the axial outer portion and the axial inner portion each having internal diameters that are greater than an intermediate surface diameter, the axial outer portion being connected to the intermediate surface by a first connecting surface, the axial inner portion being connected to the intermediate surface by a second connecting surface, the axial outer portion and the first connecting surface forming a first undercut of the radially inner surface of the tubular appendage;
a cover having;
an end wall arranged transversely with respect to the central axis (X), a cylindrical mounting wall which extends axially from one side of the end wall around the central axis (X), an outer surface of the cylindrical mounting wall having a rust protrusion, a second protrusion, and an axially extending surface between the first and second protrusions, wherein the first and second protrusions extend radially outwardly with respect to the axially extending surface;

the cover being configured to lock to the tubular appendage of the rolling bearing, a first diameter of the axially extending surface of the cylindrical mounting wall is less than or equal to the intermediate surface diameter such that no axially extending surface of the cylindrical mounting wall is configured to be in an interference fit or a press fit with the tubular appendage, the first projection of the cylindrical mounting wall having an outer diameter that is greater than the intermediate surface diameter and is configured to engage with the first connecting surface to lock the cover to the tubular appendage;

the cover including a ring arranged between the second protrusion of the cover and the tubular appendage, wherein the ring is configured to exert a resilient recall action on the first projection, which is mounted on the tubular appendage of the stationary ring, so that the first projection of the cover is engaged inside the first undercut.

8. The hub-bearing unit for a vehicle wheel according to claim 7, wherein the first connecting surface is tapered and the first projection being defined by a tapered surface that is arranged to contact the first connecting surface of the tubular appendage.

9. The hub-bearing unit for a vehicle wheel according to claim 8, wherein the ring is inserted inside a second undercut of the tubular appendage to be resiliently compressed between a shoulder surface of the second projection and the second connecting surface of the tubular appendage; the first and second connecting surfaces being tapered in axially opposite directions.

* * * * *